United States Patent
Hermann

(10) Patent No.: US 6,526,671 B2
(45) Date of Patent: Mar. 4, 2003

(54) ADAPTER FOR CHECKING THE ANGULAR ALIGNMENT OF A ROLLER WHICH IS TO BE PRECISELY SUPPORTED

(75) Inventor: Michael Hermann, Villingen (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 09/813,350

(22) Filed: Mar. 21, 2001

(65) Prior Publication Data

US 2002/0133962 A1 Sep. 26, 2002

(51) Int. Cl.⁷ .............................. G01B 3/00; G01B 3/56
(52) U.S. Cl. .................. 33/550; 33/534; 33/555.1; 33/555.3; 33/DIG. 2
(58) Field of Search .................. 33/549, 550, 551, 33/552, 553, 555.1, 555.3, DIG. 2, 534, 1 N, 501.02, 501.03, 501.04

(56) References Cited

U.S. PATENT DOCUMENTS

| | | | | |
|---|---|---|---|---|
| 3,274,693 A | * | 9/1966 | Witzke | 33/555.3 |
| 4,064,633 A | * | 12/1977 | Wertepny | 33/550 |
| 4,141,149 A | * | 2/1979 | George et al. | 33/555.3 |
| 4,580,345 A | | 4/1986 | Andrew | |
| 5,068,974 A | * | 12/1991 | Possati et al. | 33/549 |
| 5,392,526 A | * | 2/1995 | Sprague et al. | 33/534 |
| 5,586,771 A | * | 12/1996 | Koskinen | 33/705 |
| 5,758,431 A | * | 6/1998 | Golinelli | 33/549 |
| 5,918,376 A | * | 7/1999 | Syre et al. | 33/501.02 |
| 6,029,502 A | * | 2/2000 | Stuker | 33/501.02 |
| 6,264,793 B1 | * | 7/2001 | Ojala et al. | 73/159 |

FOREIGN PATENT DOCUMENTS

| | | |
|---|---|---|
| EP | 0 985 905 | 3/2000 |
| GB | 2 144 852 | 3/1985 |
| JP | 11-101628 | 4/1999 |

* cited by examiner

Primary Examiner—Diego Gutierrez
Assistant Examiner—Yaritza Guadalupe
(74) Attorney, Agent, or Firm—Nixon Peabody LLP; David S. Safran

(57) ABSTRACT

An adapter for a precision inspection instrument used for measurement of rollers or rolls in the paper, steel, film industry, without contacting the rollers or rolls. The adapter employs a high pressure fluid, such as compressed air, which emerges through a plurality of nozzles to form an air cushion for supporting the adapter nears the roller. Additionally, the adapter can be provided with adjustable, specifically defined surfaces having nozzles for forming the air cushion on rollers of various dimensions.

8 Claims, 3 Drawing Sheets

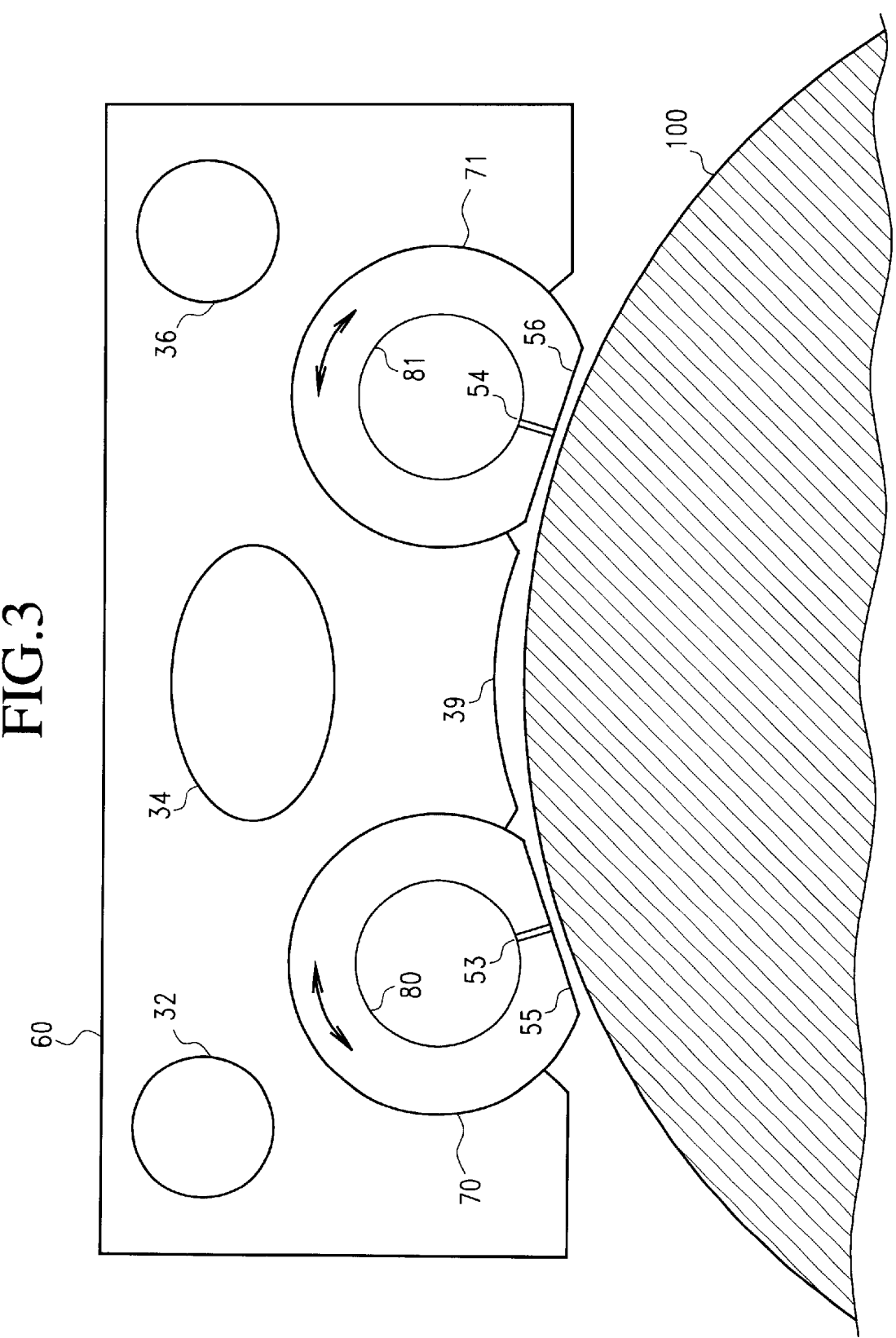

ADAPTER FOR CHECKING THE ANGULAR ALIGNMENT OF A ROLLER WHICH IS TO BE PRECISELY SUPPORTED

BACKGROUND OF THE INVENTION

1. Field of the Invention

The invention relates to an adapter for a precision inspection instrument for determining the angular alignment of a precisely supported roller, such as those employed in a printing press. These rollers may also be employed in the production of films, foils, paper webs or thin sheets in other machines.

2. Description of Related Art

It has been suggested that a printing press be modified in order to check its rollers to ensure that the axes or axis pieces of the rollers are provided with an accurately oriented end face, or are provided with an adapter, produced in a highly precise manner, which extends in the axial direction of a roller. On the roller end faces or on an adapter connected to the roller, at least one highly accurate operating angle inspection device, for example, one employing optical gyroscopes, is mounted, and the inspection device acts in two dimensions such that the components of the angular alignment of the roller are determined.

This process however requires either extremely precise manufactured roller end faces or other types of roller surfaces which can be prepared only with very great effort. However, even this process does not guarantee that in the presence of a precisely aligned axis of rotation of a roller that the surface is still exactly aligned. This is due to the fact that irregularities, such as parallel displacements, skew positions, or other geometrical eccentricities, exist in the cylinder-symmetrical axis relative to the axis of rotation of the roller.

An alternate approach is to position a precision inspection instrument for determining the orientation of rollers, which have been manufactured with high precision, directly on a roller. This approach has certain risks since fine furrows or scratch traces on the roller cannot be prevented from the contact of the instrument with the polished surface of the roller.

SUMMARY OF THE INVENTION

The above-mentioned problem is solved in accordance with this invention by constructing a device which can be placed on the roller to be checked with virtually no direct mechanical contact with the roller. The device uses a high pressure fluid, preferably a compressed air means, and relies on the principles associated with a fluid cushion. The high pressure fluid or compressed air cushions can be produced adjacent to surfaces having a defined contour, such as a roller. However, high pressure fluid or compressed air cushions can also be employed in conjunction with surfaces which can be variable through the use of an adjustment device in order that mating of the device to different rollers can be accomplished.

In order to determine the orientation of a roller, a suitable precision inspection instrument, for example, a precision instrument based on utilizing several high-precision laser gyroscopes, is provided with a foot or an adapter which is provided with high pressure fluid or compressed air to create a fluid cushion which allows the precision instrument to float on the surface of a roller at a small, specifically determined and adjustable distance. This foot or adapter has a plurality of discharge nozzles which are located in a contoured surface of the adapter, preferably a concave, arched surface. When these nozzles are supplied with acceptably high enough air pressure, or optionally, with an acceptably high pressure liquid or liquid-gas mixture, the foot or the adapter can be placed on the roller employing a fluid cushion without direct mechanical contact with the roller surface. It is also advantageous that the foot or the adapter be relatively easily moved over the roller, both in the axial direction and around the roller periphery. Depending on the size of the adapter or the foot, as well as depending on the attained floating distance, the fluid or air consumption can be several liters per second. In that situation, it is advisable to make the compressed air or high pressure fluid available close to the foot or the adapter through the use of high pressure fluid tanks or a large, portable compressor if the tank supply is not sufficient.

The invention is explained in detail below with referenced to the drawings.

BRIEF DESCRIPTION OF THE DRAWINGS

FIG. 3 shows a cross section of a device with the capability to adjust for different roller diameters.

DETAILED DESCRIPTION OF THE INVENTION

Figure 1:
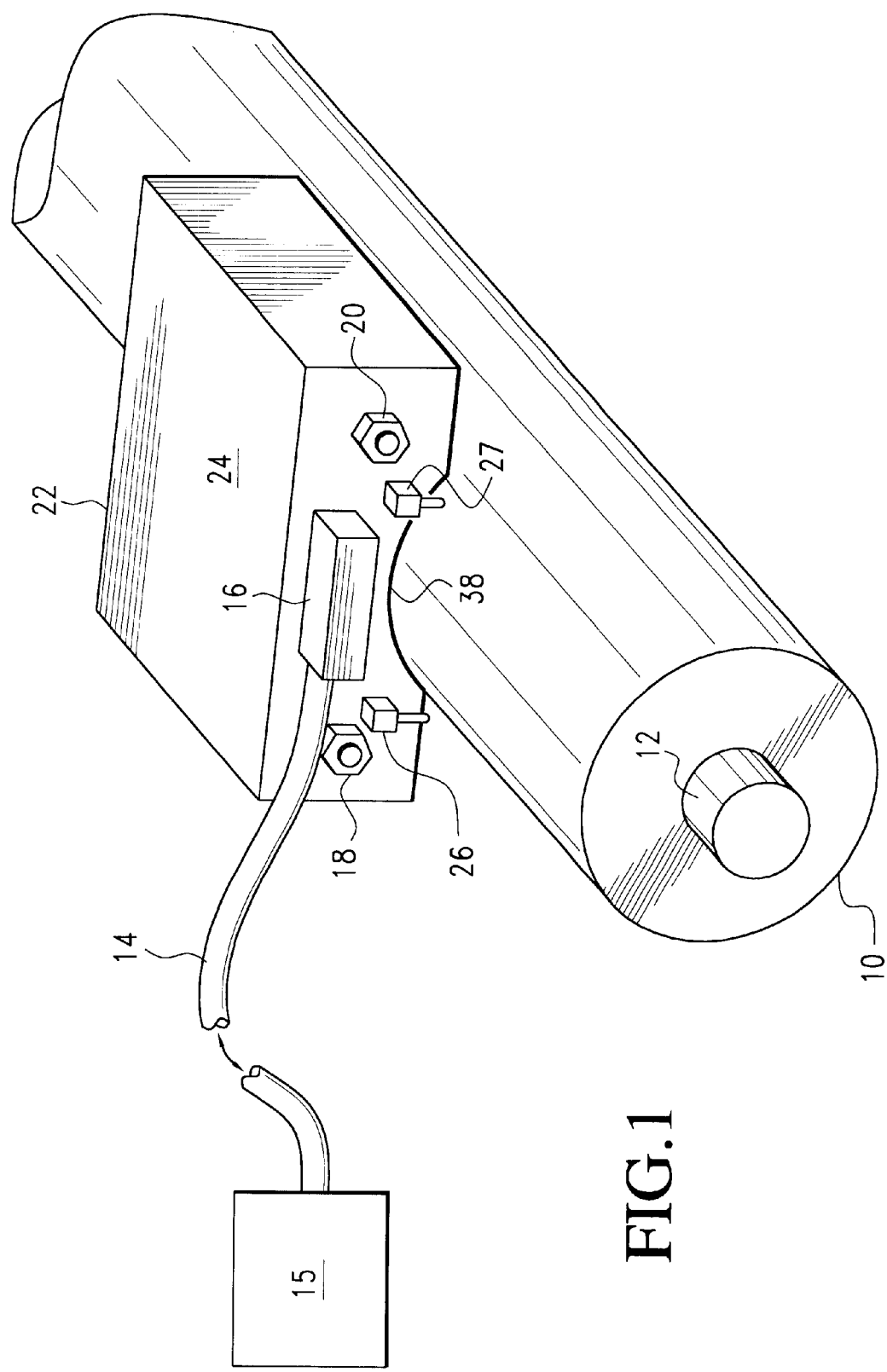
FIG. 1 is a perspective view of a device of the invention, positioned on a roller to be inspected.

As FIG. 1 shows, a first embodiment of the invention employs an adapter 22 which is located between a precision angle inspection device (not shown) and a roller 10 to be inspected for precision engineering purposes. For supporting the inspection device, the adapter has a surface 24; while the roller 10 can be pivotally mounted by means of axis pieces 12. The adapter 22 has a proportional concave surface 38, which can be matched with relative precision to the cylindrical surface of the roller 10. Air exit nozzles are machined into the concave surface so that when the adapter 22 is supplied with high pressure fluid or compressed air from a high pressure fluid source 15, by means of a hose 14 and a shoulder piece 16, relatively accurate, but contactless positioning of the adapter 22 on the roller 10 is achieved. If necessary, the adapter 22 can be integrated into the precision inspection device and then the adapter would be a special equipment foot of the device.

In one simple embodiment, the adapter 22 is formed of a hollow body which is provided with a host of small nozzles on the indicated partial concave surface 38. This embodiment, however, has the disadvantage that a simple box-like adapter may bulge due to air pressure (comparable to inflation of a tire) if the intensity of the supplied fluid pressure is not properly adjusted, and even small deformations of the adapter body may cause a reaction by the sensing device that could lead to a significant error in the results obtained. To prevent or at least reduce this problem, adapter 22 is constructed to comprise a plurality of segments and two cover plates which are held together by means of threaded rods and nuts 18, 20 to form the adapter.

Figure 2A:
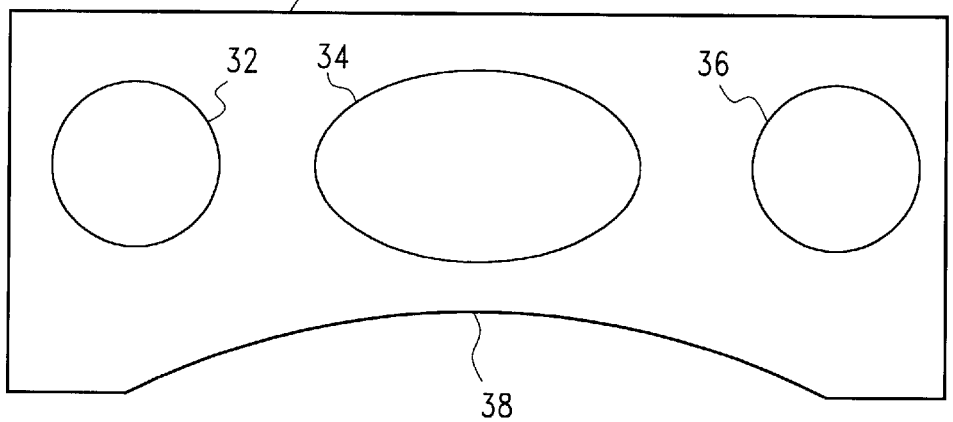
FIGS. 2a to 2c show views of individual segments employed in assembling one embodiment of the device as shown in FIG. 1.
Figure 2B:
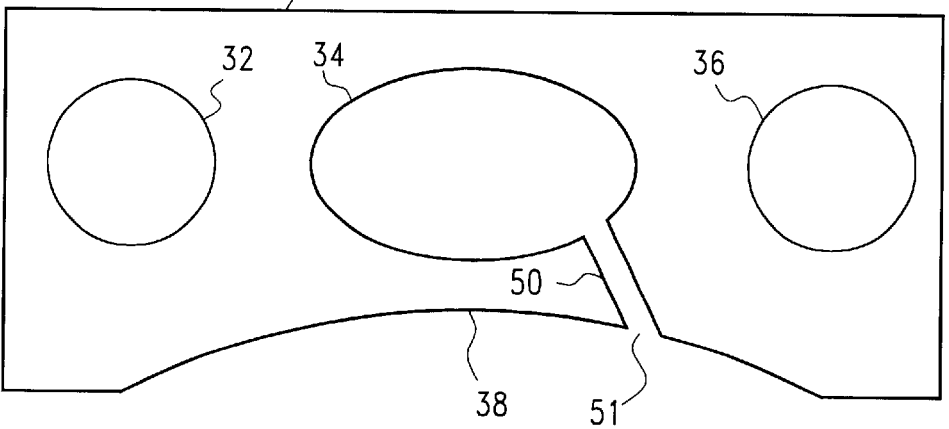
Figure 2C:
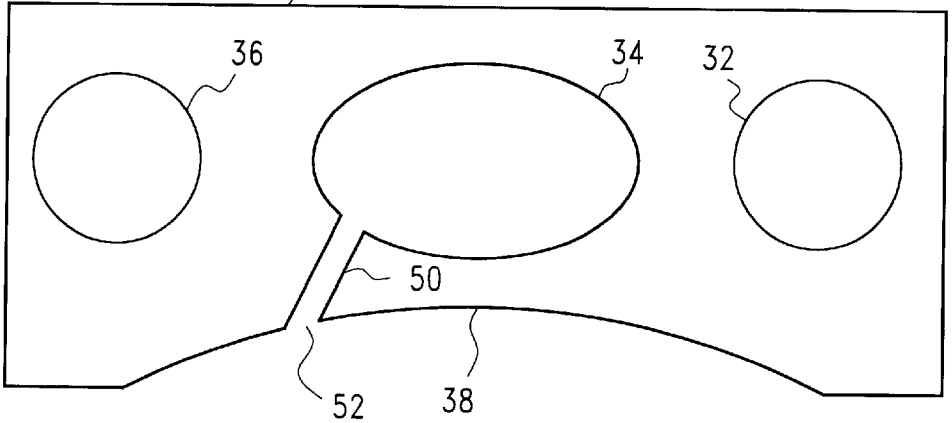

As is exemplified by FIGS. 2a–2c, the adapter is composed of an assembly of two types of segments. FIG. 2a illustrates a single segment 30 which is to be used as a spacer. The contour 38 is used for preparing the concave surface of the adapter. The circular recesses 32, 36 receive the previously indicated threaded rods. The recess 34 is a high pressure fluid or compressed air supply channel which is supplied by the shoulder piece 16, and when assembled with other segments, is sealed on its back end by a cover plate (not shown).

FIG. 2b and FIG. 2c illustrate another type of segment with a shape substantially corresponding to the version shown in FIG. 2a, but is also provided with nozzle channels 50 which end in nozzles 51, 52.

The segments illustrated in FIGS. 2a to 2c can be produced from approximately a 0.3 to 1.0 mm thick aluminum, steel, magnesium or titanium sheet. However, aluminum is preferred for reasons of cost and weight. The combined use of different materials for the segments is also an embodiment of the invention. For example, titanium segments alternated with plastic segments can be employed in order to reduce the weight of the assembly of segments. To further conserve adapter weight a plurality of additional recesses can be formed in the segments.

The segments can be assembled as a sequence of different segments for example as the sequence, employing the segments of 30, 40, 30, 40', 30, 40, 30, 40', 30, 40, 30, 40', until the desired length of the adapter is achieved. When a layered assemblage of segments, which has been secured together with a cover plates, is supplied with compressed air in the manner shown in FIG. 1, the air emerges from the nozzles 51, 52 and produces an air film (air cushion) which lifts the adapter 22 together with the precision inspection device supported by the adapter precisely above the roller 10 surface and maintains that position. However, the adapter 22 is not yet situated adjacent the roller 10 surface, compressed air is being consumed from the supply without providing any support for the adapter and inspection device.

To assist in positioning an adapter 22 adjacent a roller surface, a pneumatically or electrically actuated auxiliary support device 26, 27 (and other similarly structured rearward positioned devices not shown) can be employed. These auxiliary support devices have extendable support rods that are provided with soft plastic feet which are oriented towards the roller surface. With the support rods extended, thereby holding the adapter 22 spaced on the roller surface, the adapter 22 can be seated above the roller 10 without danger to the surface of the roller 10 or the precision inspection instrument being used. If the compressed air supply is turned on to supply the adapter 22, the support rods are retracted so that the adapter can approach the roller until the prescribed spacing is achieved by a compressed air cushion.

For very large adapters, with length dimensions of 1 meter or more, it is advantageous to construct the segments from magnesium or titanium sheets which are provided with a plurality of additional recesses so that the total weight of the adapter is maintained within desired limits. It is also an embodiment of the invention to combine several adapters 22 by means of connecting rods so that effective adapter lengths of 2 to 3 meters can be achieved.

In another embodiment of the invention, as shown in FIG. 3, an adapter 60 is illustrated which can be matched to a roller 100 having different dimensions. In this embodiment, the adapter 60 includes two hollow cylinders 70, 71 which extend essentially over the length of the adapter and have interior walls 80, 81. Along the lengthwise direction of the hollow cylinder, nozzle sets 53, 54 are provided which are designed to route high pressure fluid or compressed air from the interior of the hollow cylinder to the exterior of the adapter such that, in operation, a fluid or air cushion is formed to provide the spacing of the adapter 60 from the roller 100 to be inspected. To enhance the effect, planar ground surfaces 55, 56 can be provided on the hollow cylinders 70, 71. Additionally, the hollow cylinders 70, 71 can be swiveled around the lengthwise axis (as shown by the illustration arrows in FIG. 3) within the adapter 60 by means of suitable bearings (not shown). In this embodiment, it is therefore possible to adapt the nozzles for producing the cushion effect on rollers of different dimensions by changing the swivel position of the cylinders 70, 71. Since the hollow cylinders must be supported and guided with considerable accuracy within the adapter, it is preferred to construct the cylinders with adjustable bearings or to embed each hollow cylinder within the adapter, such as by casting the cylinder within the adapter during manufacture. If desired the adapter can be constructed with more than two hollow, swiveling cylinders with nozzle sets.

What is claimed is:

1. Adapter for use as an attachment to a precision angle inspection device for a roller, the adapter comprising:
   a concave contoured surface to be positioned adjacent the surface of said roller,
   a plurality of nozzles for directing a high pressure fluid towards a surface of the roller, and
   a source of high pressure fluid sufficient to create a fluid cushion capable of supporting the adapter spaced from the roller, said source being connect to said plurality of nozzles,
   wherein the adapter has a body formed of an assembly of a plurality of individual segments secured together in a sealing arrangement, each segment having a cavity therein to receive said high pressure fluid.

2. Adapter as claimed in claim 1, further comprising a plurality of auxiliary supports having support feet, each of which is actuatable for displacement between an extended position and a retracted position.

3. Adapter as claimed in claim 1, wherein the individual segments are made of a material selected from the group consisting of titanium, magnesium, or an alloy thereof.

4. Adapter as claimed in claim 1, wherein said plurality of nozzles are mounted to swivel within a body of the adapter.

5. Adjustable adapter as claimed in claim 4, wherein the swiveling nozzles are formed by high pressure exit surfaces of hollow cylinders mounted with said body to swivel around lengthwise axes thereof for enabling the adapter to be positioned adjacent rollers of varying dimensions.

6. Adjustable adapter as claimed in claim 1, further comprising a plurality of auxiliary supports having support feet, each of which is actuatable for displacement between an extended position and a retracted position.

7. Adjustable adapter as claimed in claim 1, wherein said assembly of a plurality of individual segments secured together comprises a mixed series of nozzle-less segments and segments with nozzles extending from said cavity to respective different angular positions along said concave contoured surface.

8. Process for determining the orientation of a roller by precision inspection techniques, comprising the steps of:
   attaching an adapter to a precision angle inspection device which precisely determines the orientation of the roller an adapter,
   positioning the precision angle inspection device and adapter adjacent the roller to be inspected
   emitting a high pressure fluid from the adapter the adapter for noncontact supporting thereof relative to a surface of the roller via a fluid cushion.

* * * * *